(12) United States Patent
Sandhu et al.

(10) Patent No.: US 11,147,006 B2
(45) Date of Patent: Oct. 12, 2021

(54) AUTOMOTIVE WIRELESS MESH COMMUNICATION

(71) Applicants: Gunmeet Sandhu, Windsor (CA); David M Caranci, Belle River (CA); Craig D Conkling, Rochester Hills, MI (US); Venkatesh Natarajan, Auburn Hills, MI (US); Steven G Malson, Metamora, MI (US); Michael J Minewiser, Beverly Hills, MI (US)

(72) Inventors: Gunmeet Sandhu, Windsor (CA); David M Caranci, Belle River (CA); Craig D Conkling, Rochester Hills, MI (US); Venkatesh Natarajan, Auburn Hills, MI (US); Steven G Malson, Metamora, MI (US); Michael J Minewiser, Beverly Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 16/511,551

(22) Filed: Jul. 15, 2019

(65) Prior Publication Data

US 2021/0022064 A1 Jan. 21, 2021

(51) Int. Cl.
*H04W 40/12* (2009.01)
*H04B 17/318* (2015.01)
(Continued)

(52) U.S. Cl.
CPC .......... *H04W 40/12* (2013.01); *H04B 17/318* (2015.01); *H04L 45/122* (2013.01);
(Continued)

(58) Field of Classification Search
None
See application file for complete search history.

(56) References Cited

U.S. PATENT DOCUMENTS 8,305,936 B2 11/2012 Wang
9,141,112 B1 * 9/2015 Loo ................. G08G 1/096866
(Continued)

FOREIGN PATENT DOCUMENTS

WO 2014200414 A1 12/2014

OTHER PUBLICATIONS

Polaris Ride Command, "https://ridecommand.polaris.com/en-us/home," accessed on May 17, 2018, 2 pages.
(Continued)

*Primary Examiner* — Jay L Vogel
(74) *Attorney, Agent, or Firm* — Ralph E Smith (57) ABSTRACT

Techniques for establishing and controlling information sharing via a dynamic wireless mesh network for a group of vehicles comprise determining a set of communication parameters for the group of vehicles and, based on the set of communication parameters, establishing the dynamic wireless mesh network for the group of vehicles, wherein each vehicle in the group of vehicles is a node in the dynamic wireless mesh network, determining a set of routing rules for the dynamic wireless mesh network, controlling information sharing between the group of vehicles through the dynamic wireless mesh network using the set of routing rules, and selectively adjusting the set of routing rules in response to changes in the set of communication parameters.

16 Claims, 4 Drawing Sheets

(51) Int. Cl.
  *H04W 24/04* (2009.01)
  *H04W 40/02* (2009.01)
  *H04L 12/733* (2013.01)
  *H04W 4/46* (2018.01)
  *H04W 84/12* (2009.01)
  *H04W 84/18* (2009.01)

(52) U.S. Cl.
  CPC ............. *H04W 4/46* (2018.02); *H04W 24/04* (2013.01); *H04W 40/026* (2013.01); *H04W 84/12* (2013.01); *H04W 84/18* (2013.01)

(56) References Cited

U.S. PATENT DOCUMENTS

| | | | |
|---|---|---|---|
| 10,091,299 B2 | 10/2018 | Mian et al. | |
| 2007/0195808 A1 | 8/2007 | Ehrlich et al. | |
| 2008/0089298 A1* | 4/2008 | Anschutz | G08G 1/0141 370/338 |
| 2009/0285124 A1 | 11/2009 | Aguirre et al. | |
| 2010/0323659 A1* | 12/2010 | Wehling | H04M 1/72544 455/404.2 |
| 2011/0112969 A1* | 5/2011 | Zaid | G06Q 10/02 705/50 |
| 2013/0139140 A1 | 5/2013 | Rao et al. | |
| 2013/0329648 A1* | 12/2013 | Lord | H04L 45/02 370/329 |
| 2015/0254985 A1* | 9/2015 | Fisher | G06K 9/00362 348/148 |
| 2020/0092685 A1* | 3/2020 | Fehrenbach | H04B 7/15507 |

OTHER PUBLICATIONS

Peloton—Platooning combines advanced technologies to safety and fuel efficiency, "https://peloton-tech.com/how-it-works," accessed on Aug. 22, 2018, 6 pages.

* cited by examiner

AUTOMOTIVE WIRELESS MESH COMMUNICATION

FIELD

The present application generally relates to vehicle communication systems and, more particularly, to techniques for establishing and controlling a dynamic wireless mesh network between a group of vehicles.

BACKGROUND

Modern vehicles are typically equipped with a communication system that allows the vehicle to communicate with other devices, such as the communication systems of other vehicles. Conventional vehicle-to-vehicle communication only provide for limited information sharing, such as the exchange of global positioning satellite (GPS) location information for vehicle tracking/navigation purposes. These conventional vehicle-to-vehicle communication systems could also potentially suffer from temporary loss of connectivity, particularly during off-road or trail driving scenarios where there could be limited network connectivity (e.g., a cellular network), there could be physical obstructions (trees, mountains, etc.), and the distances between the communicating vehicles could be continuously and drastically changing. Accordingly, while such vehicle communication systems do work well for their intended purpose, there remains a need for improvement in the relevant art.

SUMMARY

According to one example aspect of the invention, a communication system for a vehicle is presented. In one exemplary implementation, the communication system comprises: a wireless transceiver system configured to wirelessly transmit and receive information via one or more wireless communication protocols and a controller in communication with the wireless transceiver system and configured to: determine a set of communication parameters for a group of vehicles comprising the vehicle and a set of other vehicles, wherein each communication parameter of the set of communication parameters relates to the establishment and control of a dynamic wireless mesh network for the group of vehicles, and based on the set of communication parameters: establish the dynamic wireless mesh network for the group of vehicles, wherein each vehicle in the group of vehicles is a node in the dynamic wireless mesh network, determine a set of routing rules for the dynamic wireless mesh network, control information sharing between the group of vehicles through the dynamic wireless mesh network using the set of routing rules, and selectively adjust the set of routing rules in response to changes in the set of communication parameters.

In some implementations, the set of communication parameters comprises signal strengths between the wireless transceiver system of the vehicle and a set of wireless transceiver systems of the set of other vehicles. In some implementations, the set of communication parameters further comprises at least one of vehicle-to-vehicle distances and vehicle velocities. In some implementations, the set of communication parameters further comprises at least one of a lead vehicle of the group of vehicles and a current route of the group of vehicles. In some implementations, the set of routing rules is optimized to have a least number of hops between the nodes of the dynamic wireless mesh network. In some implementations, the set of routing rules is a routing table defining a vehicle-to-vehicle path for information sharing in the dynamic wireless mesh network.

In some implementations, at least some of the vehicles of the group of vehicles are moving during the establishing and/or control of the dynamic wireless mesh network. In some implementations, the wireless transceiver system is a WiFi transceiver system that is configured to communicate via the institute of Electrical and Electronics Engineers (IEEE) 802.11s communication protocol. In some implementations, the controller is further configured to determine information regarding a quality of the dynamic wireless mesh network based on the set of communication parameters and output the information to a driver of the vehicle. In some implementations, the information output to the driver of the vehicle comprises at least one of (i) a visual quality indicator and (ii) instructions regarding how to maneuver the vehicle to maintain a threshold quality level of the dynamic wireless mesh network.

According to another example aspect of the invention, a method of establishing and controlling information sharing via a dynamic wireless mesh network for a group of vehicles comprising a vehicle and a set of other vehicles is presented. In one exemplary implementation, the method comprises: determining, by a controller of the vehicle, a set of communication parameters for the group of vehicles, wherein each communication parameter of the set of communication parameters relates to the establishment and control of the dynamic wireless mesh network for the group of vehicles and, based on the set of communication parameters: establishing, by the controller and using a wireless transceiver system of the vehicle, the dynamic wireless mesh network for the group of vehicles, wherein each vehicle in the group of vehicles is a node in the dynamic wireless mesh network and the wireless transceiver system is configured to wirelessly transmit and receive information via one or more wireless communication protocols, determining, by the controller, a set of routing rules for the dynamic wireless mesh network, controlling, by the controller and using the wireless transceiver system, information sharing between the group of vehicles through the dynamic wireless mesh network using the set of routing rules, and selectively adjusting, by the controller, the set of routing rules in response to changes in the set of communication parameters.

In some implementations, the set of communication parameters comprises signal strengths between the wireless transceiver system of the vehicle and a set of wireless transceiver systems of the set of other vehicles. In some implementations, the set of communication parameters further comprises at least one of vehicle-to-vehicle distances and vehicle velocities. In some implementations, the set of communication parameters further comprises at least one of a lead vehicle of the group of vehicles and a current route of the group of vehicles. In some implementations, the set of routing rules is optimized to have a least number of hops between the nodes of the dynamic wireless mesh network. In some implementations, the set of routing rules is a routing table defining a vehicle-to-vehicle path for information sharing in the dynamic wireless mesh network.

In some implementations, at least some of the vehicles of the group of vehicles are moving during the establishing and/or control of the dynamic wireless mesh network. In some implementations, the wireless transceiver system is a WiFi transceiver system that is configured to communicate via the IEEE 802.11s communication protocol. In some implementations, the method further comprises determining, by the controller, information regarding a quality of the dynamic wireless mesh network based on the set of communication parameters and outputting, by the controller, the information to a driver of the vehicle. In some implementations, the information output to the driver of the vehicle comprises at least one of (i) a visual quality indicator and (ii) instructions regarding how to maneuver the vehicle to maintain a threshold quality level of the dynamic wireless mesh network.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

As discussed above, there remains a need for improvement over conventional vehicle-to-vehicle communication systems, which have limited sharing capabilities and also are prone to temporary communication losses. Accordingly, techniques for establishing and controlling a dynamic wireless mesh network between a group of vehicles are presented. A wireless mesh network comprises a plurality of nodes and communication through the wireless mesh network occurs by node-to-node sharing, which is also known as a "hop." By hopping from node to node, information is able to be shared across greater distances and thus shorter range wireless communication protocols can be utilized. For a group of vehicles, a wireless mesh network therebetween needs to be dynamic (moving nodes) in contrast to conventional static configurations (stationary routers/access points).

Thus, communication parameters (e.g., signal strengths) could be continuously changing and changing at a high frequency, and thus routing rules for the dynamic wireless mesh network need to be continuously and efficiently updated to reflect changes in the communication parameters. This could be particularly true for a group of vehicles participating in off-road driving where there are many different types of obstructions (trees, mountains, etc.) and the vehicles are free to move in any direction. Because the vehicles are able to move freely, as opposed to being constricted to a defined path (a road, a track, etc.), the dynamic wireless mesh network must be continuously updated such that the vehicles do not lose connectivity with the dynamic wireless mesh network. When moving along a defined path, routing is much simpler (e.g., hops in a linear or daisy-chain manner). For a group of freely moving vehicles, however, the dynamic wireless mesh network needs to be managed more efficiently and more intelligently and the routing rules likely need to be updated at a much higher rate (e.g., every second or every few seconds).

Figure 1:
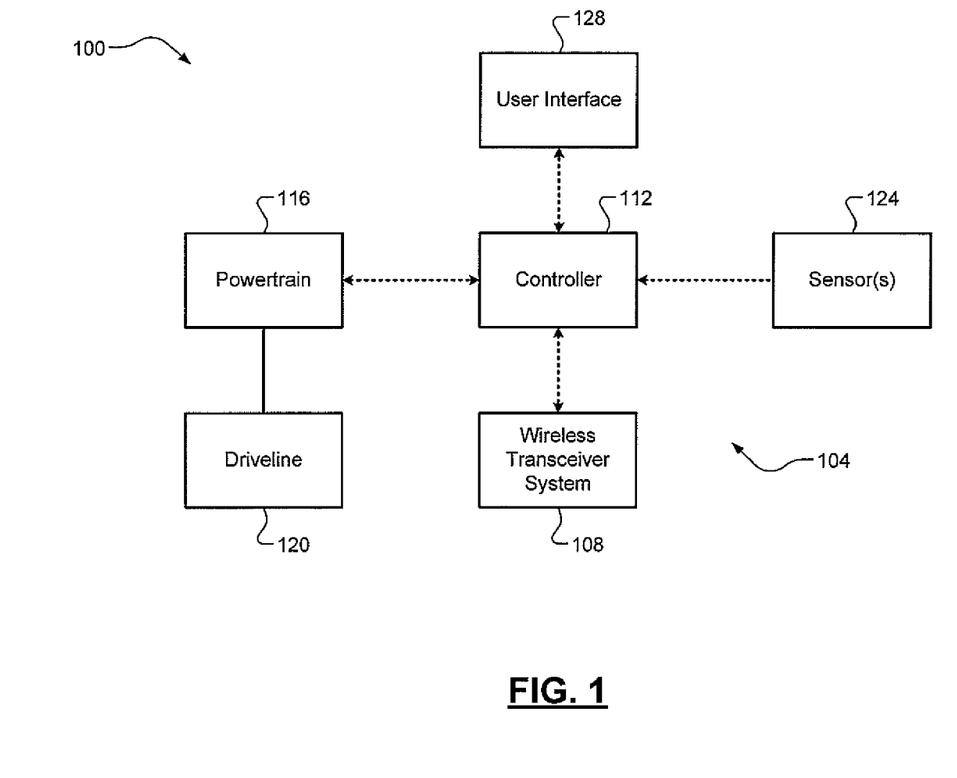
FIG. 1 is a functional block diagram of a vehicle having an example communication system according to the principles of the present disclosure.

Referring now to FIG. 1, a functional block diagram of a vehicle 100 having an example communication system 104 according to the principles of the present disclosure is illustrated. The communication system 104 generally comprises a wireless transceiver system 108 and a controller 112. The controller 112 could be a primary controller of the vehicle 100 or a separate controller specifically for the wireless transceiver system 108. The vehicle 100 further comprises a powertrain 116 (e.g., an engine and/or electric motor and a transmission) that is configured to generate drive torque that is provided to a driveline 120 to propel the vehicle 100. The vehicle 100 further comprises a set of one or more sensor(s) 124 that measure vehicle operating parameters such as, but not limited to, vehicle speed and vehicle location (e.g., global positioning satellite, or GPS coordinates). The vehicle 100 further comprises a user interface 128 (e.g., a touch display) configured to receive inputs from and/or provide outputs to a driver of the vehicle 100. It will be appreciated that the vehicle 100 could include other non-illustrated components and that the components shown and described above could be configured differently. For example, the wireless transceiver system 108 could be built into a head-unit or infotainment system that could also comprise the user interface 128.

Figure 2:
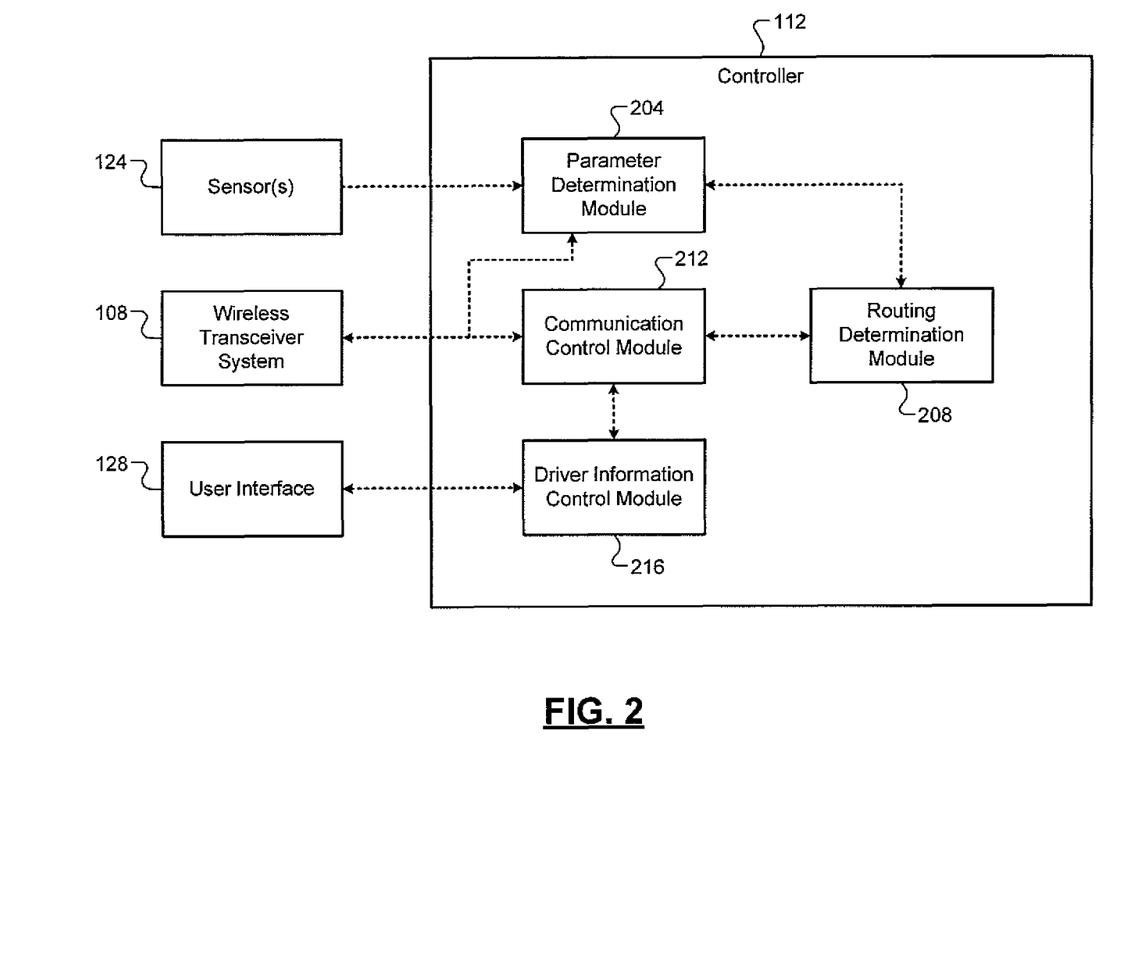
FIG. 2 is a functional block diagram of an example configuration of the communication system of FIG. 1 according to the principles of the present disclosure.
Figure 3:
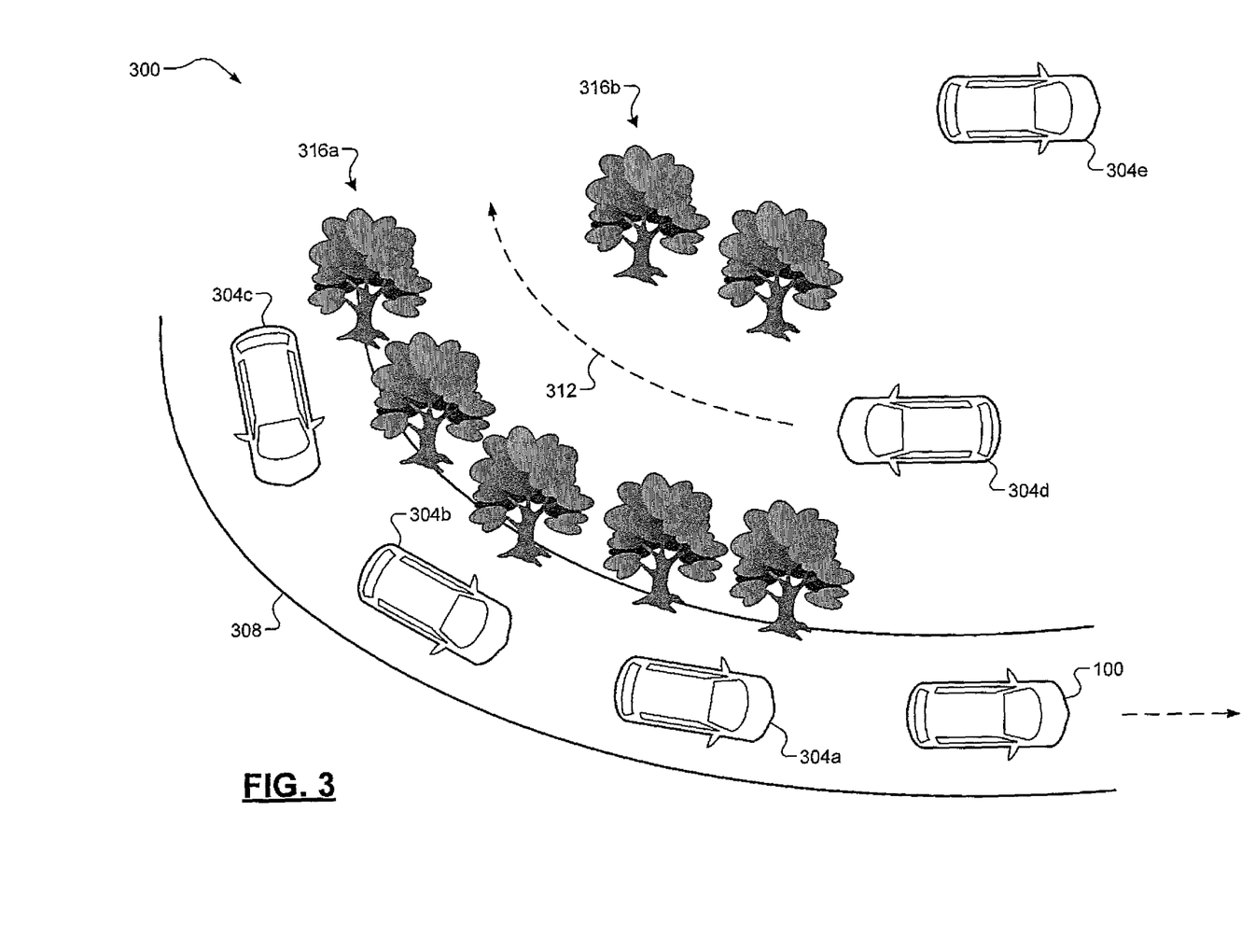
FIG. 3 is an overhead view of an example dynamic wireless mesh network between a group of vehicles according to the principles of the present disclosure.

Referring now to FIGS. 2-3, a functional block diagram of an example configuration 200 of the communication system 104 and an overhead view 300 of a dynamic wireless mesh network between a group of vehicles 304a-304e comprising vehicle 100 are illustrated. The wireless transceiver system 108 is configured to wirelessly transmit and receive information via one or more wireless communication protocols. In one exemplary implementation, the wireless transceiver system 108 is a WiFi transceiver system that is configured to communicate via the Institute of Electrical and Electronics Engineers (IEEE) 802.11s communication protocol. WiFi could be a suitable protocol for the techniques of the present disclosure because it is very secure and provides for large bandwidths, which could be necessary in order to share certain types of information such as video data. It will be appreciated, however, that the techniques of the present disclosure could be applicable to other wireless communication protocols, such as Bluetooth. The controller 112 is in communication with the wireless transceiver system 108 such that it has access to information received by the wireless transceiver system 108 and can command the wireless transceiver system 108 to transmit information. Non-limiting examples of sharable information include audio data, video data, vehicle configuration parameters (fuel level, steering angle, driveline settings, etc.), and obstruction/obstacle/hazard locations.

The controller 112 comprises a parameter determination module 204 that determines a set of communication parameters for a group of vehicles comprising the vehicle 100 and a set of other vehicles 304a-304e. Each communication parameter of the set of communication parameters relates to the establishment and control of a dynamic wireless mesh network for the group of vehicles. One example communication parameters is signal strength between the wireless transceiver system 108 and wireless transceiver systems of the other vehicles 304a-304e. When wireless transceiver systems have less than a signal strength threshold between each other, direct communication therebetween may not be possible. Other example communication parameters include vehicle-to-vehicle distances, vehicle velocities, and vehicle headings or routes. For example only, each vehicle may periodically publish or broadcast its location (e.g., GPS coordinates). Vehicle velocities and vector headings could also be determined and potentially shared with other vehicles. Other information, such as known roads/trails from map data and/or a known lead vehicle of the group of vehicles could also be leveraged to determine how the group of vehicles is traveling. For example, by knowing the current route, an upcoming cutback or turn that could result in a short term disconnect could be anticipated and accounted for. The same goes for known obstructions, which could be anticipated and accounted for.

Based on the set of communication parameters, a dynamic wireless mesh network is established between the vehicles. In the dynamic wireless mesh network, each vehicle represents a node and optimal node-to-node routing is determined and utilized for information sharing. The dynamic wireless mesh network may not include all of vehicles 100 and 304a-304e. For example, some vehicles may stray too far from the other vehicles and thus may be dropped. In FIG. 3, vehicle 304e is far away from a remainder of the vehicles and thus may be dropped as a node or may never be included in the first place. A routing determination module 208 determines a set of routing rules for the dynamic wireless mesh network. Each vehicle could determine and maintain its own set of routing rules, but it will also be appreciated that at least part of each vehicle's set of routing rules could be shared with other vehicles. The set of routing rules defines a node-by-node path via which information is shared with each of the vehicles in the group of vehicles. A communication control module 212 then utilizes the set of routing rules to command the wireless transceiver system 108 to transmit information accordingly.

In the example overhead view 300 of FIG. 3, vehicle 100 is the lead vehicle traveling along a known or defined trail or route 308 along with vehicles 304a-304c. Vehicle 304d is nearby but is traveling along another path 312 between sets of trees 316a and 316b, which could be another known/defined trail or route or could be an unknown off-road area. Vehicle 304e is further away and could also be traveling along a different route or could be temporarily stopped. As shown, the first set of trees 316a is an obstruction between vehicles 304a-304c and vehicle 304d. Vehicle 100 and vehicle 304d, however, do not have any obstructions therebetween. Vehicle 304e also may have a clear path of communication with vehicle 304d and potentially vehicle 100, depending on the vehicle-to-vehicle distances (and thus signal strengths) therebetween. A dynamic wireless mesh network could be established and maintained between this group of vehicles 100 and 304a-304e according to the techniques of the present disclosure. The establishment of the dynamic wireless mesh network could occur automatically (e.g., a public network) or could be privately controlled (e.g., a private network), such as by the lead vehicle 100.

As discussed above, after establishing the dynamic wireless mesh network, routing rules need to be determined for sharing information in the dynamic wireless mesh network. Each of the vehicles 100 and 304a-304e represents a node in the dynamic wireless mesh network. In one exemplary implementation, the routing rules are optimized to have a least number of node-to-node transmissions (hops) to improve network efficiency (increased bandwidth, increased speed, etc.). One example configuration of the routing rules is a routing table, which defines a node-by-node path to share information between different set of vehicles. In the illustrated example, vehicles 304a-304c may be unable to communicate directly with vehicles 304d-304e and thus vehicle 100 acts as an intermediary node. One example routing rule for sharing between vehicle 304c and vehicle 304d would be as follows: vehicle 304c→vehicle 304b→vehicle 304a→vehicle 100→vehicle 304d. This is also known as a daisy chain. It will also be appreciated that some of these hops could be eliminated to improve network efficiency (e.g., vehicle 304c→vehicle 304a→vehicle 100→vehicle 304d. It will also be appreciated that one vehicle (e.g., vehicle 100) could share or broadcast information to multiple other vehicles (e.g., vehicles 304d and 304a).

As the group of vehicles moves and conditions are changing, the routing rules for the dynamic wireless mesh network are being continuously updated. As previously discussed, some vehicles may at least temporarily leave the dynamic wireless mesh network and some vehicles could be added to the dynamic wireless mesh network over time. This updating is performed by the routing determination module 208 based on changes in the set of communication parameters (signal strength, vehicle-to-vehicle distances, vehicle speeds, etc.) as monitored by the parameter determination module 204. In some implementations, the drivers of the vehicles could be provided feedback regarding the quality of the dynamic wireless mesh network. The driver information control module 216 could provide such information via the user interface 128. This could include visual, audible, and/or haptic outputs to the drivers. For example only, a quality indicator, such as a number of bars indicative of network strength, could be visually provided to the drivers. In addition, the drivers could be provided with instructions regarding how to maneuver the vehicle or modify their driving in order to increase or otherwise maintain a threshold quality of the dynamic wireless mesh network. For example only, a driver could be instructed to speed up in order to maintain a closer vehicle-to-vehicle distance and signal strength with a vehicle in front of them. This could be particularly useful when the vehicles are traveling up/down a hill, where some of the vehicles will pass a top point of the hill before others.

Figure 4:
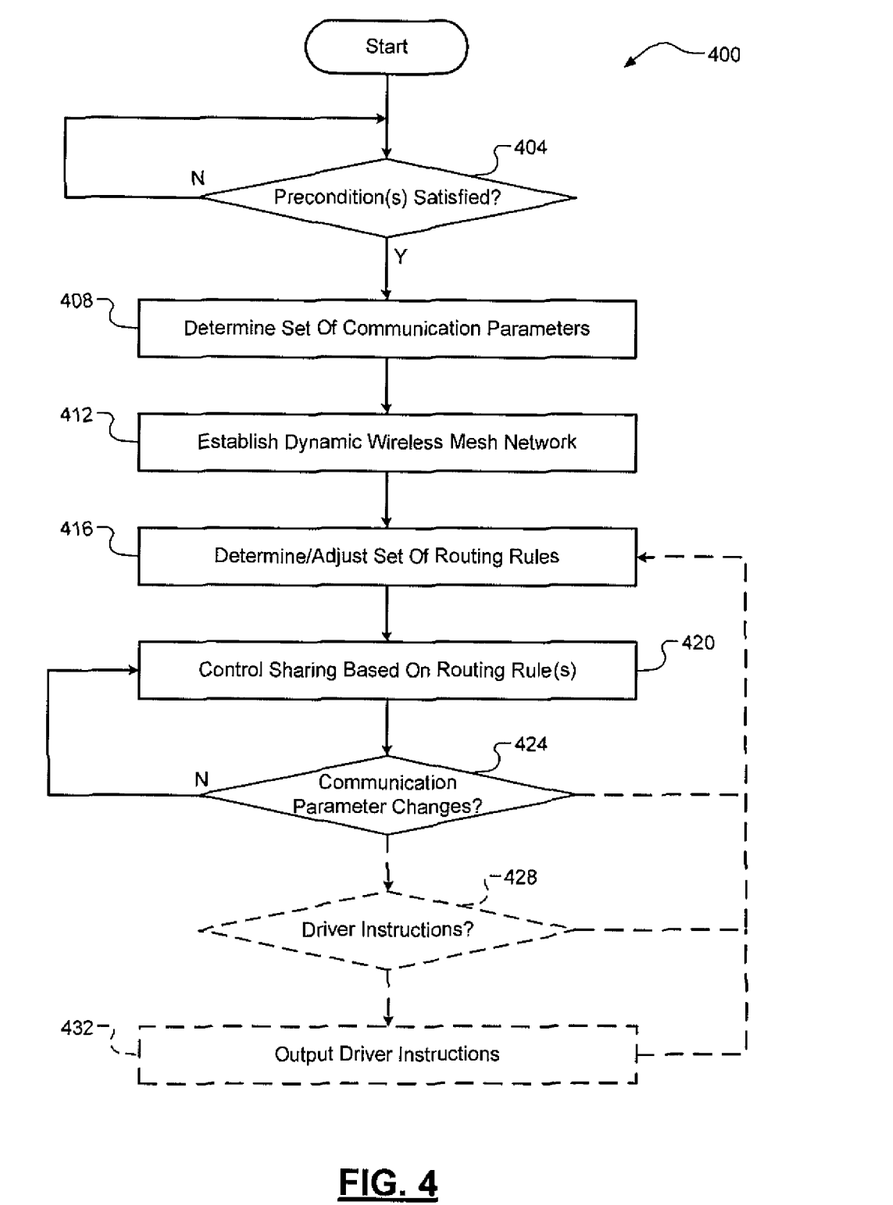
FIG. 4 is a flow diagram of an example method of establishing and controlling information sharing via a dynamic wireless mesh network for a group of vehicles comprising a vehicle and a set of other vehicles according to the principles of the present disclosure.

Referring now to FIG. 4, a flow diagram of an example method 400 of establishing and controlling information sharing via a dynamic wireless mesh network for a group of vehicles is illustrated. At 404, the controller 112 determines whether a set of one or more preconditions for dynamic wireless mesh network operation have been satisfied. Non-limiting examples of these precondition(s) include a group of vehicles that are operating and are capable of sharing information via a wireless communication protocol (e.g., IEEE 802.11s WiFi) and each vehicle having authorization to participate in the dynamic wireless mesh network (e.g., by a lead vehicle for a private network). It will be appreciated that there could be other suitable preconditions for dynamic wireless mesh network operation, such as vehicle-to-vehicle signal strength/distance/velocity thresholds. When the set of preconditions is satisfied, the method 400 proceeds to 408. Otherwise, the method 400 ends or returns to 404. At 408, the controller 112 determines the set of communication parameters relating to the establishment and control of the dynamic wireless mesh network.

At 412, the controller 112 establishes the dynamic wireless mesh network between itself and a set of other vehicles (e.g., vehicles 304a-304e) based on the set of communication parameters. At 416, the controller 112 determines a set of routing rules between the nodes of the dynamic wireless mesh network based on the set of communication parameters. At 420, the controller 112 controls information sharing in the dynamic wireless mesh network according to the set of routing rules. At 424, the controller 112 determines whether changes in the set of communication parameters have occurred such that an adjustment of the set of routing rules could be necessary. When true, the method 400 returns to 416 where the set of routing rules are adjusted accordingly. Alternatively, when true, the method 400 could proceed to optional 428 where the controller 112 could determine whether driver instructions could help increase or maintain a quality threshold of the dynamic wireless mesh network. When true, at optional 432 the controller 112 could provide such instructions. In some cases, these driver instructions could be enough to affect the set of communication parameters such that adjustment of the set of routing rules is not necessary, although the method 400 will still return to 416 to verify whether this is true.

While the techniques of the present disclosure are described as being performed by vehicle components, it will be appreciated that other devices (e.g., mobile phones) could also participate in the dynamic wireless mesh network. These devices, however, would only operate as end-nodes and thus would not participate in intermediary information routing in the dynamic wireless mesh network. This could allow users of other types of vehicles that are not equipped with the systems/methods of the present disclosure to participate in the dynamic wireless mesh network and its related social aspects.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture. It will also be appreciated that the term "module" as used herein refers to a portion of a controller/control device/processor, such as an electronic circuit or a set of instructions for execution.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A communication system for a vehicle, the communication system comprising:
   a wireless transceiver system configured to wirelessly transmit and receive information via one or more wireless communication protocols; and
   a controller in communication with the wireless transceiver system and configured to:
   determine a set of communication parameters for a group of vehicles comprising the vehicle and a set of other vehicles, wherein each communication parameter of the set of communication parameters relates establishing and controlling a dynamic wireless mesh network for the group of vehicles;
   based on the set of communication parameters:
   establish the dynamic wireless mesh network for the group of vehicles, wherein each vehicle in the group of vehicles is a node in the dynamic wireless mesh network,
   determine a set of routing rules for the dynamic wireless mesh network, the set of routing rules defining a node-by-node path via which information is shared with each of the vehicles in the group of vehicles,
   control information sharing between the group of vehicles through the dynamic wireless mesh network using the set of routing rules, and
   selectively adjust the set of routing rules in response to changes in the set of communication parameters;
   determine information regarding a quality level of the dynamic wireless mesh network based on the set of communication parameters, the quality level indicating a network strength of the dynamic wireless mesh network; and
   output the information to a driver of the vehicle, wherein the information output to the driver of the vehicle comprises instructions regarding how to maneuver the vehicle to maintain a threshold quality level of the dynamic wireless mesh network, wherein the instructions regarding how to maneuver the vehicle include vehicle speed modifications to be performed by the driver.

2. The communication system of claim 1, wherein the set of communication parameters comprises signal strengths between the wireless transceiver system of the vehicle and a set of wireless transceiver systems of the set of other vehicles.

3. The communication system of claim 2, wherein the set of communication parameters further comprises at least one of vehicle-to-vehicle distances and vehicle velocities.

4. The communication system of claim 3, wherein the set of communication parameters further comprises at least one of a lead vehicle of the group of vehicles and a current route of the group of vehicles.

5. The communication system of claim 1, wherein the set of routing rules is optimized to have a least number of hops between the nodes of the dynamic wireless mesh network.

6. The communication system of claim 5, wherein the set of routing rules is a routing table defining a vehicle-to-vehicle path for information sharing in the dynamic wireless mesh network.

7. The communication system of claim 1, wherein at least some of the vehicles of the group of vehicles are moving during the establishing and/or control of the dynamic wireless mesh network.

8. The communication system of claim 1, wherein the wireless transceiver system is a WiFi transceiver system that is configured to communicate via an Institute of Electrical and Electronics Engineers (IEEE) 802.11s communication protocol.

9. A method of establishing and controlling information sharing via a dynamic wireless mesh network for a group of vehicles comprising a vehicle and a set of other vehicles, the method comprising:
   determining, by a controller of the vehicle, a set of communication parameters for the group of vehicles, wherein each communication parameter of the set of communication parameters relates to establishing and controlling the dynamic wireless mesh network for the group of vehicles;

based on the set of communication parameters:
  establishing, by the controller and using a wireless transceiver system of the vehicle, the dynamic wireless mesh network for the group of vehicles, wherein each vehicle in the group of vehicles is a node in the dynamic wireless mesh network and the wireless transceiver system is configured to wirelessly transmit and receive information via one or more wireless communication protocols,
  determining, by the controller, a set of routing rules for the dynamic wireless mesh network, the set of routing rules defining a node-by-node path via which information is shared with each of the vehicles in the group of vehicles,
  controlling, by the controller and using the wireless transceiver system, information sharing between the group of vehicles through the dynamic wireless mesh network using the set of routing rules, and
  selectively adjusting, by the controller, the set of routing rules in response to changes in the set of communication parameters;

determining, by the controller, information regarding a quality level of the dynamic wireless mesh network based on the set of communication parameters, the quality level indicating a network strength of the dynamic wireless mesh network; and outputting, by the controller, the information to a driver of the vehicle, wherein the information output to the driver of the vehicle comprises instructions regarding how to maneuver the vehicle to maintain a threshold quality level of the dynamic wireless mesh network, wherein the instructions regarding how to maneuver the vehicle include vehicle speed modifications to be performed by the driver.

10. The method of claim 9, wherein the set of communication parameters comprises signal strengths between the wireless transceiver system of the vehicle and a set of wireless transceiver systems of the set of other vehicles.

11. The method of claim 10, wherein the set of communication parameters further comprises at least one of vehicle-to-vehicle distances and vehicle velocities.

12. The method of claim 11, wherein the set of communication parameters further comprises at least one of a lead vehicle of the group of vehicles and a current route of the group of vehicles.

13. The method of claim 9, wherein the set of routing rules is optimized to have a least number of hops between the nodes of the dynamic wireless mesh network.

14. The method of claim 13, wherein the set of routing rules is a routing table defining a vehicle-to-vehicle path for information sharing in the dynamic wireless mesh network.

15. The method of claim 9, wherein at least some of the vehicles of the group of vehicles are moving during the establishing and/or control of the dynamic wireless mesh network.

16. The method of claim 9, wherein the wireless transceiver system is a WiFi transceiver system that is configured to communicate via an Institute of Electrical and Electronics Engineers (IEEE) 802.11s communication protocol.

* * * * *